United States Patent [19]

Weiss et al.

[11] 4,104,144
[45] Aug. 1, 1978

[54] RADIATION-CURABLE COATING COMPOSITIONS AND INKS

[75] Inventors: Marvin Weiss, New Providence; Phillip Adams, Murray Hill; Gerald I. Nass, Secaucus; Roland L. Leitner, Somerset, all of N.J.

[73] Assignee: Kewanee Industries, Bryn Mawr, Pa.

[21] Appl. No.: 749,168

[22] Filed: Dec. 9, 1976

Related U.S. Application Data

[62] Division of Ser. No. 585,615, Jun. 10, 1975, Pat. No. 4,026,939.

[51] Int. Cl.$^2$ .............................. C08F 2/46; C08F 4/00
[52] U.S. Cl. ............................... 204/159.23; 528/75; 260/23.5 R; 204/159.15; 204/159.16; 204/159.19; 204/159.24; 260/23 TN; 260/42.21; 260/42.52; 260/42.53; 260/404.5; 260/859 R; 427/54; 428/425; 560/26; 560/115; 560/158
[58] Field of Search ...................... 204/159.23, 159.24; 260/404.5, 23 TN, 23.5

[56] References Cited

U.S. PATENT DOCUMENTS

| | | | |
|---|---|---|---|
| 3,267,080 | 8/1966 | Karnal | 260/404.5 |
| 3,345,311 | 10/1967 | Ehrlich et al. | 260/404.5 |
| 3,360,389 | 12/1967 | Frank | 260/404.5 |
| 3,856,830 | 12/1974 | Kuehn | 260/404.5 |
| 4,026,939 | 5/1977 | Weiss et al. | 260/404.5 |

Primary Examiner—Richard B. Turer
Attorney, Agent, or Firm—Arthur A. Jacobs

[57] ABSTRACT

Radiation-curable coating compositions and inks which have as a component a polymerizable monomer or a mixture of polymerizable monomers, said monomer or monomers being represented by the formula:

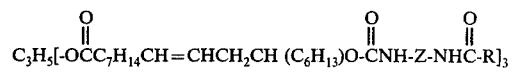

where Z represents a divalent aromatic, aliphatic or cycloaliphatic radical such as the following:

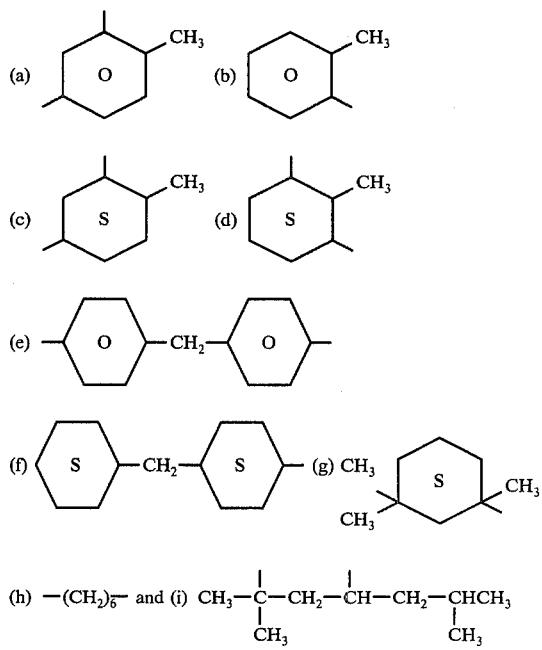

and R is substantially an unsaturated monovalent organic radical of a polyfunctional polyethylenecally unsaturated ester.

5 Claims, No Drawings

RADIATION-CURABLE COATING COMPOSITIONS AND INKS

This is a division of application Ser. No. 585,615, filed June 10, 1975, now U.S. Pat. No. 4,026,939.

This invention relates to polymerizable compounds, and it particularly relates to radiation-curable coating compositions which incorporate such compounds.

In accordance with the present invention, there are provided radiation-curable compositions which have as a component a polymerizable monomer, or a mixture of polymerizable monomers, which can be represented by the formula:

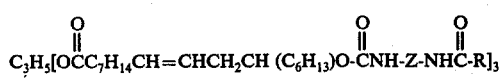

where Z represents a divalent aromatic, aliphatic or cycloaliphatic radical such as the following:

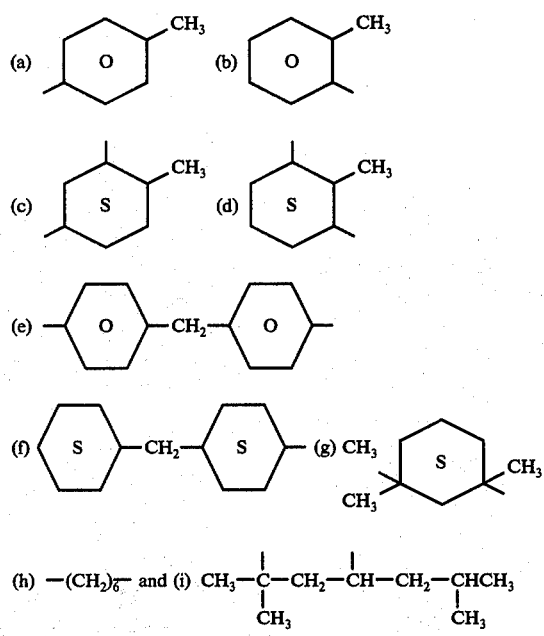

and R is substantially an unsaturated monovalent organic radical of a polyfunctional polyethylenecally unsaturated ester as, for example,

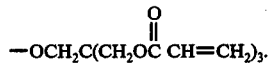

For purposes of clarification, $C_3H_5$ represents the trivalent radical

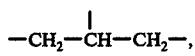

which is the hydrocarbon chain of glycerine, and

represents a divalent residue of ricinoleic acid, both of these radicals having their origin in castor oil, which is principally the triricinoleate of glycerine; the divalent radical

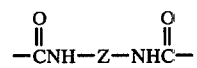

represents the reaction product which is formed when a diisocyanate or formula $Z(NCO)_2$ is reacted with two equivalents of active hydrogen such as is found in hydroxyl substituents; and the monovalent radical R originates in such esters as the triacrylate ester of pentaerythritol, the pentaacrylate ester of dipentaerythritol, the heptaacrylate ester of tripentaerythritol, and the like.

For purposes of still greater clarification, $Z(NCO)_2$ is exemplified by such compounds as: (a) 2,4-toluene diisocyanate, (b) 2,6-toluene diisocyanate, (c) 2,4-methylcyclohexyl diisocyanate, (d) 2,6-methylcyclohexyl diisocyanate, (e) 4,4'-methylene-bis-phenyl isocyanate, (f) 4,4-methylene-bis-cyclohexyl isocyanate, (g) isophorone diisocyanate, (h) 1,6-hexamethylene dissocyanate, (i) phorone diisocyanate and others of similar nature, as well as mixtures of such diisocyanates.

Compositions which contain an adequate proportion of the polymerizable monomer or monomers of the structure shown above have those unique properties which make them suitable for use in very fast radiation-curable coatings, including quick-cure inks.

In describing the present invention, the following definition of terms are applicable:

The term "monomer" refers only to those compounds of known molecular weight that can be represented by a definite molecular structure and that are capable of being polymerized to materials of higher but uncertain molecular weight and uncertain molecular structure. In this respect, the compounds constituting the present invention are "monomers", as are such other compounds as pentaerythritol triacrylate, pentaerythritol tetraacrylate, and the like.

The more general term "pre-polymer", refers not only to "monomers", but also to partially polymerized resins which are capable of being further polymerized.

The term "radiation" refers to ultraviolet, microwave or electron beam radiation.

The term "vehicle " refers to those quick-curing compositions which comtain one or more pre-polymers, but no colorant. These "vehicles" are capable of being cured when subjected to radiation of proper intensity. When a colorant is added to the vehicle, the product is referred to as an "ink".

When referring to "quick-cure inks", the work "vehicle" refers to that portion of the ink which contains the pre-polymer and all the other additives except the colorant.

In recent years, radiation-curable vehicles and inks have been formulated which contain pre-polymers that polymerize rapidly when subjected to radiation under controlled conditions. Although polymerizable agents such as pre-polymers, and expecially radiation sensitive monomers, are the most essential and critical components of any quick-curing coating or ink, it is preferable that, in addition to such agents, the vehicles ordinarily contain one or more additives such as:

(1) Photo-initiators, which accelerate or catalyze polymerization after, but not before, exposure to radiation. Examples of such photo initiators are benzophenone, acetophenone, Michler's ketone, acyloins, benzoin ethers, etc., as well as mixtures. It is, however, to be understood that any photo-initiator which can be feasibly used is within the scope of the present invention.

(2) Inhibitors, which prevent polymerization before, but not after, exposure to radiation. Examples of such inhibitors are phenothiazine, hydroquinone, hydroquinone ethers, and mixtures. Here, too, any other feasible inhibitor may be used.

(3) Other monomers or pre-polymers to co-polymerize with the radiation-sensitive monomers or pre-polymers, examples of such pre-polymers additives being pentaerythritol tetraacrylate, and dipentaerythritol hexaacrylate.

(4) Various non-volatile oils, waxes, resins, varnishes, diluents, extenders, accelerators, etc.

Additives of the above type are usually incorporated into the vehicle for the purpose of endowing it with one or more special properties.

An important property of the monomers of the present invention is that they are compatible with most of the commonly used additibes so that it is possible to blend many desirable properties into a vehicle containing such additives.

The monomers of the present invention have proper rheological properties in that they can be formulated into vehicles and then into printing inks which adhere well to surfaces and flow smoothly. They also spread evenly in the press without running, sticking, or accumulating.

The monomers of the present invention may also be formulated into vehicles which make quick-cure inks and coatings that produce hard, tack-free films that resist ordinary abrasion. When used in quick-qure inks, they produce prints of high fidelity.

In addition to the above, the monomers of the present invention have a proper balance between hydrophobic and hydrophylic properties. Therefore, they can be incorporated into quick-cure inks that may be used not only for direct printing, but also in printing processes which involve exposure to water, as, for example, in lithography. In this respect, a monomer of high hydrophylicity cannot be used in aqueous processes because it will emulsify, while, on the other hand, if it is too hydrophobic it will not print properly.

The most important feature of the monomers of the present invention, however, is the ability to polymerize quickly upon exposure to radiation into hard, thin films with much cross-linking. While there is no present desire or intent to be bound by any particular theory of operation, if is to be noted that it is well understood in the field of polymers that cross-linking endows a polymeric film with hardness and abrasion resistance. It is also well understood in the art that the prerequisite for cross-linking is a sufficiency of property oriented, easily activated bond-forming moieties.

The only bond-forming functional group with which this invention is concerned is the ethylenic type of double bond. As used in this description, the terms "double-bond", and "unsaturation" will apply only to ethylenic double bonds such as are found in esters of low molecular weight $\alpha, \beta$-unsaturated acids, particularly esters of acrylic or methacrylic acid. Examples of such esters are (1) the triacrylate and tetraacrylate esters of pentaerythritol; (2) the trimethacrylate and tetramethacrylate esters of pentaerythritol; and (3) the pentaacrylate and hexacrylate esters of dipentaerythritol. The examples below will support the hypothesis that it is the multiplicity of double bonds and their proper orientation in the monomers that is responsible for the ability of the products of this invention to polymerize rapidly upon exposure to radiation, with a large degree of cross-linking.

Though the products of this invention are suitable for use in all kinds of radiation-sensitive coatings, they are especially suited for formulating quick-cure inks. Inks which ae formulated with an adequate concentration of the monomers of this invention will, upon exposure to radiation of sufficient intensity, cure so rapidly that they can be used in multi-colored high speed presses in which several colors are ptinted in succession on the same surface without subjecting the printed surface between imprints to special curing treatment.

It is well known in the art that low molecular weight monomers alone are seldom useful as pre-polymers for fast curing vehicles. Some are too volatile, and represent physiological or ecological hazards, while some do not cure rapidly enough, and some are emulsified too easily with water and cannot be used successfully in vehicles for inks which are exposed to water, as in lithography. Even such highly unsaturated monomers as pentaerythritol tetraacrylate or dipentaerythritol hexaacrylate have their shortcomings as sole prepolymers despite their high degree of unsaturation.

It has become common practice in the art to synthesize more suitable radiation-sensitive pre-polymers by chemically grafting low molecular weight unsaturated monomers onto intermediate or high molecular weight materials, Acrylic acid and methacrylic acid, for example, have been used to esterify polyol resins, thereby producing materials of higher molecular weight containing multiple double bonds. However, such products often have been found to have too great an affinity for water to be useful in printing ink.

Another common practice is to react hydroxyalkyl acrylates or hydroxyalkyl methacrylates with isocyanates or diisocyanates to produce carbamates. These products have improved resistance to water, but the vehicles into which they are compounded usually have cure speeds that are much too slow for the use in quick-curing coating, particularly in practical high speed printing.

Hydroxyalkyl acrylates or methacrylates have also been used together with polyol resins and diisocyanates. In principle, one equivalent of a hydroxyl group from an unsaturated hydroxyalkyl ester, and one equivalent of a hydroxyl group from the polyol each react with an equivalent of isocyanate in a diisocyanate. In a certain sense, the diisocyanate "couples" the two hydroxylated molecules. The product of this "coupling" is a dicarbamate.

Such products are known to be useful in compounding certain kinds of fast curing coatings. But unless they are synthesized under rigorously controlled conditions which lead to the exhaustion of all or most of the hydroxyl content, they tend to have poor hydrophobic properties and emulsify in the presence of water. This tendency makes them unsuitable for use in quick-cure coatings which must be used in the presence of water, and particularly unsuitable for use in vehicles which are to be used for preparing radiation-sensitive lithographic inks. This shortcoming is apparently due to the high content of free, unreacted hydroxyl groups in the modified polyol resin.

A novel type of material which acts as a binder for paints when subjected to high-energy radiation is described in U.S. Pat. No. 3,509,234. The material which is disclosed in that patent is a reaction product of toluene diisocyanate, 2-hydroxyethyl methacrylate and castor oil, the castor oil being used as the polyol supplier of hydroxyl groups. In principle, it would be expected that the castor oil would make that material much less hydrophylic than if a polyol resin were to be used as the source of hydroxyl groups. The product described in that patent was found by applicants to be entirely unsuitable for use in lithographic inks because of its very high viscosity.

According to the disclosure in the aforesaid patent, the diisocyanate was added slowly to the castor oil in the first step, and the hydroxyethyl methacrylate was added to the adduct of the first step. Applicant's investigation of this procedure indicated that the product of the first step was responsible for the very high viscosity. According to this investigation, it appears that this is due to the high degree of cross-linking between the trifunctional castor oil and the difunctional diisocyanate.

Applicants have found that superior rheological properties were obtained by modifying the reaction procedure whereby the diisocyanate and hydroxyethyl methacrylate were reacted as a first step, and castor oil was added to the adduct as a second step. However, although this procedure improved the rheological properties of the final product, the material was still unsuited for use in a quickcuring vehicle because of its relatively slow rate of polymerization. It appears that this is due to an insufficiency of unsaturation. Accordingly, a monomer was prepared by means of the modified procedure, but pentaerythritol triacrylate was substituted for hydroxyethyl methacrylate. This substitution increased the number of double bonds and also introduced a more sensitive radiation-curable moiety.

In accordance with the present invention, it was found that the fastest cure rate and the best ratio of hydrophobic and hydrophylic properties are obtained when there is a minimum of unreacted hydroxyl groups in the monomer. Consequently, the procedure was modified to provide a complete, or nearly complete, conversion of all hydroxyl groups in pentaerythritol triacrylate to carbamate. The complete conversion of hydroxyl groups was assured by the use of an excess of isocyanate equivalents. This procedure, however, was complicated by the fact that it was necessary to avoid the presence of unreacted diisocyanate lest it increase the viscosity by cross-linking with castor oil in the subsequent reaction. This complication was overcome by reacting pentaerythritol triacrylate with the diisocyanate under conditions which minimized the presence of free difunctional diisocyanate. Upon completion of the subsequent reaction with castor oil, the slight excess of isocyanate could be eliminated by adding a long chain alcohol, such as n-decanol. Such an alcohol not only eliminated the excess of isocyanate groups, but it also acted as a diluent without affecting the hydrophobic-hydrophylic balance of the vehicle.

The completely modified monomer synthesis consists of preliminary assays of the polyacrylate esters and castor oil for their hydroxyl equivalency, and the diisocyanate for its isocyanate content. Then, as a first step, one equivalent of hydroxyl group in the polyacrylate is reacted with two equivalents of isocyanate in the diisocyanate, thereby leaving approximately one equivalent of isocyanate unreacted. Before proceeding with the second step, the unreacted isocyanate content of the adduct is determined by chemical assay. Then a quantity of castor oil equal to or slightly greater than the required quantity of hydroxyl group is added in order to obtain a reaction between the residual isocyanate and the hydroxyl.

Because of the slow activity of the secondary hydroxyl groups in castor oil, the second reaction is seldom fully complete, so the product of the second step usually contains a very slight excess of isocyanate. This excess of isocyanate is determined by assay, and is eliminated by reaction with a long chain alcohol. An excess of such an alcohol merely acts and does not alter the desirable characteristics of the vehicle.

Contrary to the teachings of the prior art, which indicates that the complete conversion of hydroxyl groups in pentaerythritol triacrylate causes an undesirable condition in lithography, known as "ink-stripping", which is the phenomenon where the ink does not pick up enough water to print satisfactorily, so that the isocyanatemodified ester products would require a hydroxyl number of about 15–70, it has been found that when using the present invention, the present composition functions best, and no "ink-stripping" occurs, when the hydroxyl number is as close to zero as possible.

Another point to be noted is that the mere presence of hydrophobic unsaturated oils, such as dehydrated castor oil, tung oil, linseed oil, soya oil, etc, in uncombined states, by mere admixture, is not enough to bestow on the vehicle the aforesaid desirable properties. It is necessary for the oil to contain free hydroxyl groups which can eventually be bonded chemically to the polyacrylate esters by way of the diisocyanates.

The presence of other non-hydroxyl-bearing polymerizable monomers, such as pentaerythritol tetraacrylate, in the vehicle does not detract from the efficacy of the monomer in such a vehicle, nor does it interfere with the reaction between pentaerythritol triacrylate and diisocyanate or the subsequent reaction of the adduct with castor oil. This is a particularly useful property because it permits the use in the synthesis of commercial pentaerythritol triacrylate, which contains a substantial proportion of pentaerythritol tetraacrylate. The pentaerythritol tetraacrylate appears in the final product as a radiation-sensitive polymerizable monomer.

The following methods of analysis in determining the contents of the product were used:

Determination of Hydroxyl Content of Commercial Pentaerythritol Triacrylate

Weigh accurately about 5–7 grams of commercial pentaerythritol triacrylate into a 250 ml. glass stoppered iodine flask, and dissolve in 25 ml. of dry toluene (dried over molecular sieve 5A). Weigh accurately about 2.8 grams of toluene diisocyanate, previously assayed, into the flask and add one drop of dibutyltin diacetate (or a similar tin catalyst). Shake well and then moisten the well of the stoppered flask with dry toluene. Heat the flask in an oven or on a water bath at 60° C for two hours, shaking occasionally. Cool to room temperature. Wash the sides of the flask with dry toluene and then pipette 20 ml. of 2N dibutylamine in dry toluene into it. Shake well, loosen the stopper, and bring to a boil on a hot plate. Then remove the flask from the hot plate and let it cool spontaneously to room temperature (which takes about 30 minutes), shaking it occasionally during the cooling.

Prepare a blank using 20 ml. of 2N dibutylamine in 25 ml. of dry toluene, and treat it in the identical manner, simultaneously with the assay.

Back titrate the assay sample and the blank with 1N hydrochloric acid to the end point, using bromophenol blue indicator.

Calculation for unreacted toluene diisocyanate ml. 1N HCl (blank) − Ml. 1N HCl (Sample) × 0.0871 = grams of uncreated toluene diisocyanate.

Calculation for reacted toluene diisocyanate

Grams toluene diisocyanate added − grams toluene diisocyanate unreacted = grams reacted toluene diisocyanate.

Calculation of equivalent weight of pentaerythritol triacrylate sample $$\frac{\text{grams pentaerythritol sample} \times 87.1}{\text{grams reacted toluene diisocyanate}} =$$

equivalent weight of pentaerythritol triacrylate sample.

Determination of Isocyanate

This determination is obtained by the method described in "Organic Functional Group Analysis" by F. E. Chirchfield, p. 57, published 1963 by MacMillan & Co., N.Y.

Determination of Hydroxyl Equivalent Weight of Castor Oil

This determination is obtained by the method described in "Organic Functional Group Analysis" by F. E. Critchfield, p. 83, published 1963 by MacMillian & Co., N.Y.

The following examples are illustrative of the invention.

EXAMPLE 1

Into a 20 gallon stainless steel reactor was placed 25 lbs. of benzyl benzoate and 12 lbs., 10 oz. (0.0725 lb. moles) of a commercial mixture of 2,4-toluene diisocyanate and 2,6-toluene diisocyanate in ratio of 80/20, plus 6 grams of dibutyltin diacetate. The mixture was heated to 56° C, after which, with constant stirring, 47 lbs. (0.0725 lb. moles) of commercial pentaerythritol triacrylate, previously heated to 45°, was introduced slowly over a period of one hour. (commercial pentaerythritol triacrylate contains pentaerythritol di-, tri- and tetraacrylate in ratio of about 5/45/50. (The material used in this synthesis had a hydroxyl equivalent weight of 648).

The reaction temperature was raised and maintained at 75° C for three hours, while stirring, after which time the unreacted isocyanate was determined by assay. (In this particular synthesis, 0.0683 lb. equivalents, or about 47% of the total number of isocyanate equivalents added, remained unreacted).

To the hot mixture was added 25 lb., 4 oz. (0.0726 lb. equivalents) of castor oil in one portion, and the reaction temperature was maintained between 70° and 80° C for about 4½ hours, with stirring. (The castor oil used in this synthesis had a hydroxyl equivalent weight of 348).

At this point, an assay of the mixture revealed that 0.0036 lb. equivalents of isocyanate remained free. Three lbs. of n-decanol was added to quench the unreacted isocyanate, and the mixture was permitted to cool, with stirring. Finally, additional benzyl benzoate was added to bring the viscosity to 5200 cps. at 25° C. (13 lbs. of benzyl benzoate was added in this particular synthesis).

EXAMPLE 2

The same procedure was followed in Example 1, except that 13 lbs. of a commercial mixture of 2,4-methylcyclohexyl diisocyanate and 2,6-methylcyclohexyl diisocyanate was substituted for the toluene diisocyanate.

EXAMPLE 3

The same procedure was followed as in Example 1, except that 18 lbs. of 4,4′-methylene-bis-phenyl isocyanate was substituted for the toluene diisocyanate.

EXAMPLE 4

The same procedure was followed as in Example 1, except that 18 lbs., 8 oz. of 4,4′-methylene-bis-cyclohexyl isocyanate was substituted for the toluene diisocyanate.

EXAMPLE 5

The same procedure was followed as in Example 1, except that 15 lb. of isophorone diisocyanate was substituted for the toluene diisocyanate.

EXAMPLE 6

The same procedure was followed as in Example 1, except that the initial 25 lb. of benzyl benzoate was not added at the beginning of the reaction, and about 38 lbs. of benzyl benzoate was used in the final addition to bring the viscosity to 5200 cps.

EXAMPLE 7

The same procedure was followed as in Example 1, except that 8 lbs., 7 oz. of hydroxyethyl acrylate (hydroxyl equivalent weight of 116) was substituted for the commercial pentaerythritol triacrylate.

The following testing procedure was used to test the curing speeds of films:

The apparatus used was a conveyor with variable speed drive of from 30 feet per minute to 360 feet per minute. The space immediately above the web of the conveyor was fitted with a Hanovia six inch, 200 watts per linear inch, medium pressure mercury lamp enclosed in an elliptical reflector. The bulb was capable of adjustment from 4 inches to 8 inches above the web.

For testing, the conveyor speed was set at 180 feet per minute, and the source of ultraviolet radiation was set at 4 inches above the web. It is estimated that these conditions are equivalent to a commercial installation curing at a rate of over 1000 feet per minute.

The unpigmented material from Examples 1 to 7 were applied with a #4 Meyer Rod to 70 lb. Montie offset enameled coated stock as a substrate.

Panels, upon which the materials to be tested had been applied, were run through the conveyor until the applied films became immobile. The films were considered cured when they could no longer be smeared when rubbed with the finger.

The rate of cure was calculated by a number which reflected the number of passes required to cure the film, the fewer the number of passes, the faster the cure rate.

RESULTS

The products of Examples 1, 2, 3, 4, 5 and 6 required only one pass to be cured.

The product of Example 7 required six passes for curing.

This illustrates the overwhelming superiority of the monomer made from pentaerythritol triacrylate over the monomer made from hydroxyethyl acrylate.

The formulation and testing of Inks

Formulations

In formulating the following inks, the components were all weighed together and hand mixed. Then they were passed through a three roll mill until properly ground and the solids adequately dispersed. Normally, two passes were sufficient, although in some instances, three passes were necessary:

EXAMPLE 8

| Product from Example 1 | 65 parts |
|---|---|
| Benzophenone | 4 parts |
| Michler's ketone | 2 parts |
| Triphenyl phosphine | 2 parts |
| Benzyl benzoate | 12 parts |
| Alkali refined linseed oil | 5 parts |
| G/S Phthalocyanine Blue | 10 parts |
| Total | 100 parts |

EXAMPLE 9

| Product from Example 2 | 52 parts |
|---|---|
| Benzophenone | 10 parts |
| Michler's ketone | 2 parts |
| Triphenyl phosphine | 2 parts |
| Benzyl benzoate | 12 parts |
| Micronized polyethylene | 2 parts |
| Milori Blue | 5 parts |
| Carbon black | 15 parts |
| Total | 100 parts |

EXAMPLE 10

| Product from Example 3 | 62.2 parts |
|---|---|
| Benzophenone | 4.0 parts |
| Michler's ketone | 2.0 parts |
| Triphenyl phosphine | 2.0 parts |
| Benzyl benzoate | 12.0 parts |
| Alkali refined linseed oil | 4.0 parts |
| Benzidine Yellow | 13.0 parts |
| Red Lake C Base | 0.8 parts |
| Total | 100 parts |

EXAMPLE 11

| Product from Example 4 | 50 parts |
|---|---|
| Benzophenone | 4 parts |
| Michler's ketone | 2 parts |
| Triphenyl phosphine | 2 parts |
| Benzyl benzoate | 15 parts |
| Alkali refined linseed oil | 5 parts |
| Red Lake C | 22 parts |
| Total | 100 parts |

EXAMPLE 12

| Product from Example 5 | 65 parts |
|---|---|
| Benzophenone | 4 parts |
| Michler's ketone | 2 parts |
| Triphenyl phosphine | 2 parts |
| Benzyl benzoate | 12 parts |
| Alkali refined linseed oil | 5 parts |
| G/S Phthalocyanine Blue | 10 parts |
| Total | 100 parts |

EXAMPLE 13

| Product from Example 6 | 52 parts |
|---|---|
| Benzophenone | 10 parts |
| Michler's ketone | 2 parts |
| Triphenyl phosphine | 2 parts |
| Benzyl benzoate | 12 parts |
| Micronized polyethylene | 2 parts |
| Milori Blue | 5 parts |
| Carbon black | 15 parts |
| Total | 100 parts |

EXAMPLE 14

The same components were blended as in Example 11, except that the product from Example 7, was substituted for the product from Example 4.

Testing the curing speeds of Inks

The same equipment used for testing the materials without colorants was used for testing the inks. The results were as follows:

The inks of Examples 8, 9, 10, 11, 12 and 13 were cured with only one pass. The product of Example 14 required six passes.

This illustrated the overwhelming superiority in printing inks of the monomer made from pentaerythritol triacylate over the monomer made from hydroxyethyl acrylate. The substitution of hydroxyethyl methacrylate for the hydroxyethyl acrylate gives results similar to that for the hydroxyethyl acrylate.

The invention claimed is:

1. A radiation curable composition containing, as a vehicle, a polymerizable agent selected from the group consisting of a monomer, and mixtures of such monomers, wherein said monomer has the formula:

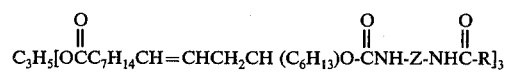

wherein Z is a divalent aromatic, aliphatic or cycloaliphatic radical and R is an alkoxy group substituted by a plurality of $\alpha,\beta$-unsaturated low molecular weight acylate groups.

2. The composition of claim 1 and including a photo initiator which accelerates polymerization after exposure of the composition to radiation.

3. The composition of claim 1 and including an inhibitor which prevents polymerization before exposure to radiation.

4. The composition of claim 1 and including another prepolymer capable of co-polymerization with said agent.

5. The composition of claim 1 and including a coloring agent.

* * * * *